United States Patent [19]

Grayson

[11] Patent Number: 5,247,845
[45] Date of Patent: Sep. 28, 1993

[54] POWER TAKEOFF ADAPTER FOR DRIVE SHAFT

[75] Inventor: James M. Grayson, Pewaukee, Wis.

[73] Assignee: Briggs & Stratton Corporation, Milwaukee, Wis.

[21] Appl. No.: 884,868

[22] Filed: May 13, 1992

Related U.S. Application Data

[63] Continuation of Ser. No. 604,819, Oct. 26, 1990, abandoned.

[51] Int. Cl.[5] .................. F16H 37/00; F02F 7/00
[52] U.S. Cl. ......................... 74/11; 74/15.6; 74/15.63; 74/597; 123/195 A; 123/197.1; 123/196 CP
[58] Field of Search .......... 74/11, 15.63, 15.6, 74/15.66, 596-598; 279/1 A; 408/239 A; 603/334, 343, 297, 300, 359; 123/196 R, 196 CP, 197.4, 197.1, 195 A

[56] References Cited

U.S. PATENT DOCUMENTS

| | | | |
|---|---|---|---|
| 1,063,790 | 6/1913 | Greaves | 403/343 X |
| 1,440,685 | 1/1923 | Korvin-Kroukovsky | 123/195 A |
| 1,715,489 | 6/1929 | Baer | 74/597 |
| 1,839,623 | 1/1932 | Waddell | 123/195 A |
| 1,845,110 | 2/1932 | Wright | 74/597 |
| 2,471,982 | 5/1949 | Shulda | 74/597 |
| 2,645,944 | 7/1953 | Crichton, Jr. et al. | 403/343 X |
| 2,698,013 | 12/1954 | Brill et al. | 123/195 A |
| 2,741,932 | 4/1956 | Whitney et al. | 74/597 |
| 2,765,664 | 10/1956 | Storey | 74/15.63 |
| 2,878,681 | 3/1959 | Howlett | 74/15.66 |
| 2,904,358 | 9/1959 | Rajan | 403/259 |
| 3,144,736 | 8/1964 | Rusk et al. | 403/334 X |
| 3,521,507 | 7/1970 | Yogus et al. | 408/239 |
| 3,676,120 | 7/1972 | Nelson et al. | 408/239 X |
| 3,688,560 | 9/1972 | Broman et al. | 74/15.63 |
| 4,400,136 | 8/1983 | Seyffert | 403/259 X |
| 4,624,156 | 11/1986 | Kamata | 74/595 |
| 4,767,230 | 8/1988 | Leas, Jr. | 403/259 X |
| 4,778,349 | 10/1988 | Browning | 74/15.6 X |

FOREIGN PATENT DOCUMENTS 2831660  3/1979  Fed. Rep. of Germany ..... 279/1 A Primary Examiner—Carl D. Friedman
Assistant Examiner—Winnie Yip
Attorney, Agent, or Firm—Andrus, Sceales, Starke & Sawall

[57] ABSTRACT

A power takeoff adapter for extending a power shaft such as the crankshaft of an engine. The power takeoff adapter includes a male pin adapted to be received in a complementary female receptacle in the crankshaft, wherein torque applied during operation initially tightens the coupling between the adapter and the crankshaft.

6 Claims, 1 Drawing Sheet

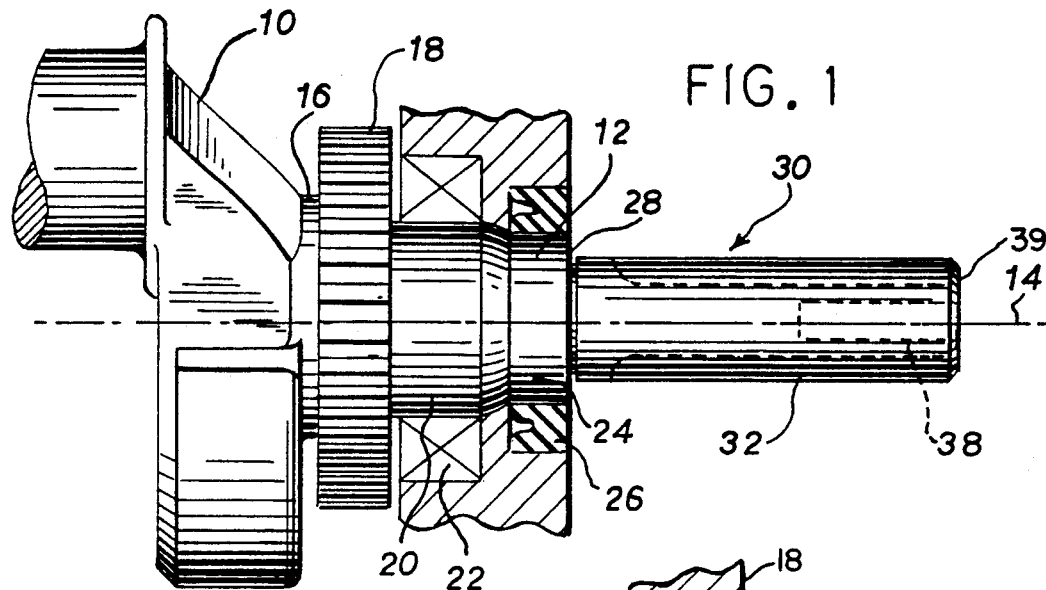
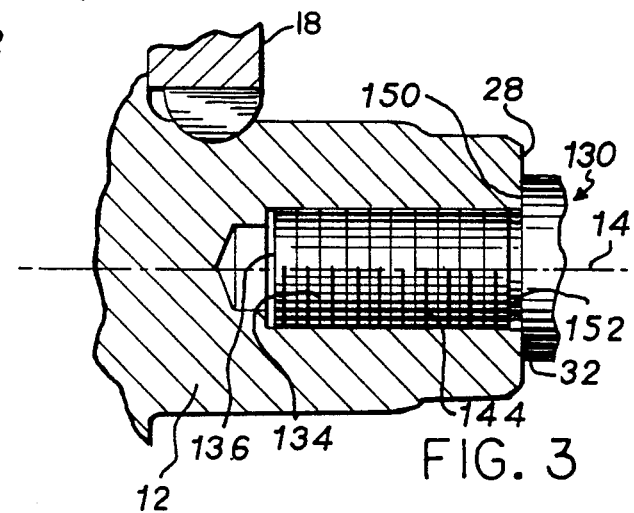
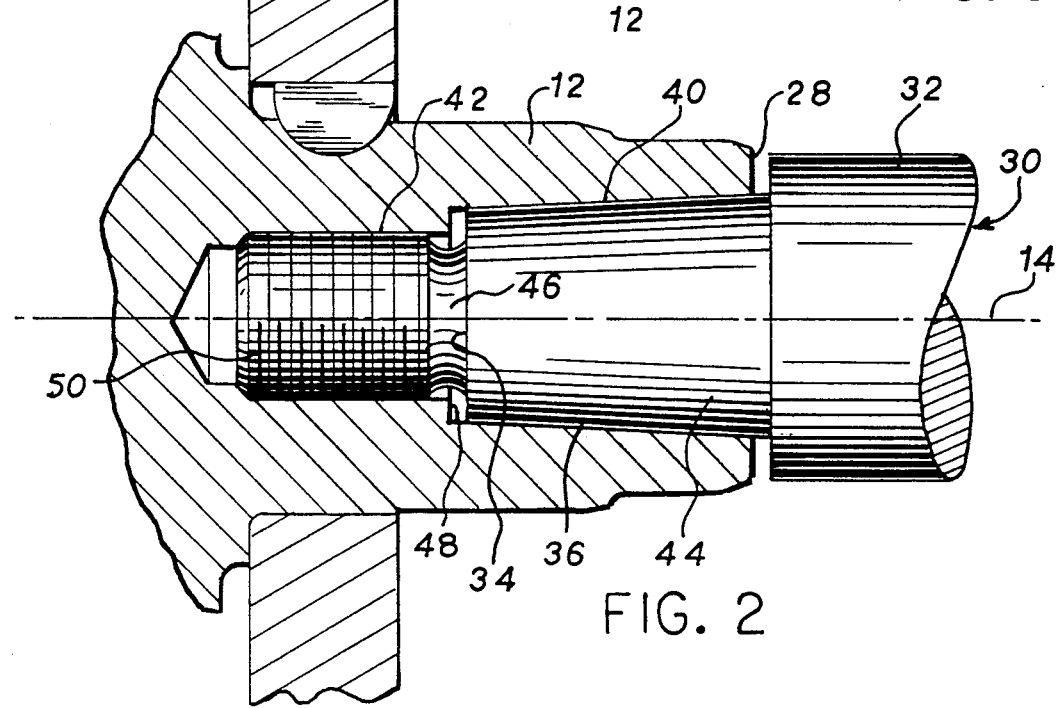

POWER TAKEOFF ADAPTER FOR DRIVE SHAFT

This application is a continuation of application Ser. No. 07/604,819, filed Oct. 26, 1990 now abandoned.

BACKGROUND OF THE INVENTION

The subject invention is related generally to drive shaft assemblies for internal combustion engines, turbines, armatures and the like, and is specifically directed to a power takeoff adapter for extending the drive shaft.

Typically, where power units such as internal combustion engines and the like are used in a variety of applications, each unit requires a variety of drive shafts, each specifically designed for particular applications. Since the drive shaft is a basic component of the power unit, it is part of the initial assembly. This requires that the power application be known at the time of assembly to assure installation of the power drive shaft. When power units are mass produced for a variety of applications, it is not always possible, to predetermine the end use and application. Often, this results either in the requirement that the unit be disassembled and the drive shaft changed out to accommodate specific applications or that quantities of the various types be stocked. In the first case, disassembly and reassembly is time consuming and unnecessarily adds to the manufacturing cost of the unit. In the second case, overhead costs or lack of level scheduling exists.

Known prior art devices incorporated add-on drive shaft extensions having a male threaded drive shaft stub with a female tapped extension and a driving feature such as an external hexagonal drive or other additional fastening components which were attached to the extension. The use of the female tapped extension limits the ability of the drive shaft extension device to accept internally threaded load and restricts the end use of the power unit, particularly where space and size of the extension is limited.

Examples of crankshafts adapted for receiving the female tapped extensions are shown, for example, in U.S. Pat. Nos. 4,624,156 issued to Kamata on Nov. 25, 1986; U.S. Pat. No. 1,845,110 issued to Wright on Feb. 16, 1932 and U.S. Pat. No. 1,440,685 issued to Korvin-Kroukovsky on Jan. 2, 1923.

A tapered splice for crankshaft bearings female threaded end is shown and described in U.S. Pat. No. 1,839,623 issued to waddell on Jan. 5, 1932.

SUMMARY OF THE INVENTION

The subject invention is directed to a power takeoff adapter which may be added to a drive shaft of a power unit such as, by way of example, the crankshaft of an engine, after final assembly, permitting preassembled engines to be readily adapted to a variety of applications. The power takeoff adapter of the invention is particularly well suited for use on internal combustion engines of less than 20 horsepower. Such engines are generally incorporated in a variety of applications and require crankshafts which can be adapted to loads having a variety of drive couplings such as, by way of example, threaded and tapered shafts with various key slots, diameters and lengths.

By using the power takeoff adapter of the subject invention, the engines may be fully assembled before the final application is defined, maximizing the efficiency of the assembly operation while at the same time decreasing the inventory of specific engines by utilizing a standardized crankshaft design. An important aspect of the invention is that the entire power unit can be assembled, tested and shipped without the power takeoff unit. This increases safety during assembly by eliminating the presence of extended power takeoff units on the drive shaft and further, reduces and standardizes package size since the power takeoff unit may be shipped separately.

In the preferred embodiment, the crankshaft terminates in an outer end which is substantially flush with the engine's power takoff mounting face. A female receptacle is provided in the end of the crankshaft and includes a tapered socket portion for receiving a male pin with complementary threads on a power takeoff adapter which can be designed to accept a specific application.

In one embodiment, the receptacle is tapered inwardly from the end of the crankshaft and includes a tapped socket inboard of the taper. The power takeoff adapter includes a pin having a tapered portion complementary with the taper in the receptacle and a male threaded portion adapted to be received by the tapped socket of the receptacle. Upon assembly, the tapered pin is drawn into the tapered receptacle by tightening the threads. The power takeoff adapter and crankshaft are further tightened by the operating torque of the engine during use. The power takeoff adapter and crankshaft are designed such that the tapers on the receptacle and the pin absorb all operating loads during use, making the assembly inseparable without distortion such as by heating or the like and rendering the threads unnecessary and nonfunctional during use.

A second embodiment includes a cylindrical, tapped female receptacle in the end of the crankshaft and a mated cylindrical, threaded pin on the end of the power takeoff adapter, wherein a shoulder on the power takoff adapter is adapted to engage and abut against the face of the crankshaft when the pin is inserted in the receptacle and drawn fully into the receptacle by tightening the threads. During use, the torque of the engine tightens the shoulder against the end face until friction on the face exceeds the torque load.

Both embodiments provide a versatile crankshaft assembly having operating characteristics virtually identical to the one piece crankshafts of the prior art. The invention is particularly advantageous when short power takeoff adapters are required and female tapped crankshaft extensions are not feasible.

It is, therefore, an object and feature of the invention to provide for a power takeoff adapter which may be mounted on a standard drive shaft of a power unit to permit use of the unit in a variety of applications without requiring a plurality of distinct drive shaft designs.

It is yet another object of the invention to provide a power takeoff adapter which will accommodate applications requiring internal drive shaft threads.

It is a further object of the invention to provide a crankshaft assembly which maximizes the efficiency of the assembly operation by permitting identical engines and crankshafts to be fully assembled without regard to application.

Other objects and features of the invention will be readily apparent from the accompanying drawing and description of the preferred embodiment.

BRIEF DESCRIPTION OF THE DRAWING

FIG. 1 is a partial sectional view of an engine crankcase assembly including the power takeoff adapter for the present invention.

FIG. 2 is an enlarged view showing the relationship between the drive shaft housing and the power takeoff adapter of FIG. 1.

FIG. 3 is a sectional view of an alternative embodiment of the invention.

DESCRIPTION OF THE PREFERRED EMBODIMENT

As shown in FIG. 1, a typical power unit such as, by way of example, an internal combustion engine includes a drive shaft housing or crankcase 10 having a drive shaft or crankshaft 12 carried therein for rotation about a drive or crank axis 14. The engine and crankshaft assembly operate in the manner well known to those skilled in the art. The outer exposed end of the crankcase is typically stepped, the first step 16 for engaging a gear set 18, the second step 20 machined to provide a bearing surface in contact with the journal bearings 22, and the third step 24 comprising a sealing surface for the shaft seal 26. The particular configuration of the crankshaft is arbitrary and is not part of the invention.

In the preferred embodiment, the crankshaft shaft 12 terminates at end face 28 which is substantially flush with and parallel to the face of the crankcase cover 26, and is substantially orthogonal to the crank axis 14. The power takeoff adapter 30 comprises a cylindrical load element 32 having a male pin 34 extending outwardly from one end thereof and being adapted to be received by a complementary female receptacle 36 provided in the end of the crankshaft 12 (see FIG. 1). An important feature of the adapter 30 is its ability to accommodate externally threaded drivers on loads, by including space for an internally tapped, female receptacle 38 on the drive end 39, requiring a minimum amount of space for extending the crankshaft beyond the face of the seal 26. The particular configuration of the load element 32 of the adapter is arbitrary and is dictated by the particular application for the engine.

The female receptacle 36 provided in the end of the crankshaft 12 includes a tapered portion 40 tapering inwardly from the end face 28 toward the crankcase housing 10 and coaxial with the crank axis 14. The taper terminates in a cylindrical, tapped socket 42. The adapter 30 includes the power element 32 having a male pin 34 extending from one end thereof. The pin includes a tapered portion 44 which is complementary with and adapted to be received by the tapered portion 40 of the crankshaft. In the preferred embodiment, the smallest cross-section of tapered portion 44 at the outer end 46 of the pin taper is larger in cross-section than the smallest cross-section 48 of the crankshaft receptacle taper 40. The pin terminates in a cylindrical threaded section 50 which is complementary with and adapted to be received by the tapped socket 42 provided in the crankshaft.

When the power takeoff adapter 30 is inserted in the crankshaft receptacle 36, the threaded pin portion 50 is adapted to be received by the tapped socket 42. Upon turning of the adapter 30 to tighten the threads, the tapered pin portion 44 is drawn into the tapered receptacle 36 to provide a tight, secure assembly. During operation, the torque on the adapter 30 provided by the load for which the engine is used further tightens the assembly between the adapter 30 and the crankshaft 12, wherein the tight fit between the tapers 36 and 44 provide an assembly rendering the threaded coupling nonfunctional. In practice, once the assembly is assembled and torque is applied, it is impractical to remove the adapter from the crankshaft without distorting the crankshaft by, for example, applying heat to the crankshaft to expand the receptacle 36.

An alternative embodiment of the power takeoff adapter is illustrated in FIG. 3. As there shown, the adapter 130 includes a power element 32, similar to that shown in FIGS. 1 and 2. The pin 134 provided on the end of the cylindrical power element 32 comprises a cylindrical threaded portion 144 which is adapted to be received by a complementary tapped receptacle 136 provided in the crankshaft 12. The pin end of the cylindrical power element 32 terminates in a flat planar shoulder 150. When the threaded pin 134 is inserted in the tapped receptacle 36, the shoulder 150 is substantially orthogonal to the crank axis 14 and is substantially parallel to the planar end face 28 on the end of the crankshaft 12. As the adapter 130 is turned into the receptacle 136 and threads are tightened, the face of the shoulder 150 engages and abuts against the planar face 28 on the end of the crankshaft 12. In its preferred configuration, an annular relief groove 152 is provided between the shoulder 150 and the pin 134 to assure proper engagement between the end face 28 and the face of the shoulder 150. Once torque is applied to the power takeoff adapter 130 during operation, the torque is operative to further tighten the shoulder 150 against the end face 28 by drawing the threaded pin 134 further into the tapped receptacle 136, thereby providing a tight secure assembly.

This invention provides a power takeoff adapter for a universal crankshaft, wherein the adapter can be specifically designed for a particular operation without respect to the crankshaft configuration. By using the power takeoff adapter of the present invention, a wide variety of adapters may be provided without requiring disassembly and reassembly of the crankcase and crankshaft. This permits the engine and crankcase assembly to be standardized without restricting or limiting application of the engine.

While specific features and embodiments of the invention are described herein, it will be understood that the invention includes all modifications and enhancements within the scope and spirit of the appended claims.

I claim:

1. A power takeoff assembly for a crankshaft of an internal combustion engine comprising:

a crankcase including a removable cover, said cover having an opening formed therethrough defining a crank axis, and said cover including an exterior planar face disposed perpendicular to said crank axis adjacent said opening;

a crankshaft having opposite ends rotatably mounted in said crankcase about said crank axis, one of said opposite ends comprising a power takeoff end mounted for rotation within said opening in said crankcase cover, said power takeoff end terminating at an end face which is disposed perpendicular to said crank axis and which is flush with and parallel to the exterior planar face of said crankcase cover, said end face being accessible from the exterior of said crankcase; a power takeoff adapter for extending the crankshaft axially from said crankcase cover; and mounting means for removably mounting said power takeoff adapter on the power takeoff end of said crankshaft, said mounting means comprising a female receptacle formed in the power takeoff end of said crankshaft and in axial alignment with said crank axis, said female receptacle having an open end and a closed end with said opened communicating with said end face of said crankshaft and at least a portion of said female receptacle being threaded; said power takeoff having one end removably secured to said female receptacle and carried by said crankshaft for rotation therewith about said crank axis.

2. The assembly of claim 1 wherein said one end of said adapter includes a male pin receivable by said female receptacle, the pin including a cylindrical male threaded portion complementary with the female threaded portion, whereby the in may be inserted into the receptacle and drawn into the receptacle by tightening said threads.

3. The assembly of claim 2 wherein the female receptacle further includes an inwardly tapered unthreaded portion adjacent the end face of the crankshaft, and a cylindrical threaded portion axially inwardly of the tapered portion; and the male pin of said adapter includes a tapered, unthreaded portion and a cylindrical threaded portion, whereby tightening of the threads draws the tapered portion of the male pin into the tapered portion of the female receptacle.

4. The assembly of claim 3 wherein the threaded portions of the receptacle and pin are smaller in diameter than the smallest diameter of the tapered portions of the receptacle and pin.

5. The assembly of claim 2 wherein the male pin of said adapter defines a shoulder on said adapter which is substantially parallel to the planar face of said crankcase cover and adapted for engaging the end face of said crankshaft when said pin is received and secured in said female receptacle.

6. The assembly of claim 5 wherein the threaded portion of the receptacle is adjacent to said end face of said crankshaft and the threaded portion of the male pin of said adapter is adjacent to said shoulder.

* * * * *

UNITED STATES PATENT AND TRADEMARK OFFICE
CERTIFICATE OF CORRECTION

PATENT NO. : 5,247,845
DATED : September 28, 1993
INVENTOR(S) : James M. Grayson It is certified that error appears in the above-indentified patent and that said Letters Patent is hereby corrected as shown below:

Column 5, line , delete "opened" and substitute therefore --open end --.

Column 5, line 21, delete "in" and substitute therefore -- pin --.

Signed and Sealed this

Twentieth Day of September, 1994

Attest:

BRUCE LEHMAN

*Attesting Officer*  *Commissioner of Patents and Trademarks*